(12) United States Patent
Yen

(10) Patent No.: US 6,900,988 B2
(45) Date of Patent: May 31, 2005

(54) LOW HEIGHT USB INTERFACE CONNECTING DEVICE AND A MEMORY STORAGE APPARATUS THEREOF

(75) Inventor: Sheng Shun Yen, Taipei (TW)

(73) Assignee: Power Quotient International Ltd., Taipei Hsien (TW)

( * ) Notice: Subject to any disclaimer, the term of this patent is extended or adjusted under 35 U.S.C. 154(b) by 0 days.

(21) Appl. No.: 10/637,519

(22) Filed: Aug. 11, 2003

(65) Prior Publication Data

US 2004/0027817 A1 Feb. 12, 2004

Related U.S. Application Data

(62) Division of application No. 10/058,503, filed on Jan. 30, 2002, now Pat. No. 6,744,634.

(30) Foreign Application Priority Data

Nov. 23, 2001 (TW) ........................................ 90220288 U
Dec. 27, 2001 (TW) ........................................ 90223070 U

(51) Int. Cl.[7] .............................................. H05K 1/14
(52) U.S. Cl. ........................ 361/737; 361/797; 361/686; 710/74
(58) Field of Search ................................ 361/797, 737, 361/785, 684, 686, 787; 439/945, 946, 948, 638; 174/250, 255; 712/247–248; 710/74, 301

(56) References Cited

U.S. PATENT DOCUMENTS

| 6,435,409 | B1 | * | 8/2002 | Hu ............................... 235/441 |
| 6,522,552 | B1 | * | 2/2003 | Lee ............................... 361/752 |
| 6,738,259 | B2 | * | 5/2004 | Le et al. ....................... 361/737 |
| 2004/0038592 | A1 | * | 2/2004 | Yang |
| 2004/0087213 | A1 | * | 5/2004 | Kao |

* cited by examiner

*Primary Examiner*—K. Cuneo
*Assistant Examiner*—Hung S. Bui
(74) *Attorney, Agent, or Firm*—Troxell Law Office, PLLC

(57) ABSTRACT

A connecting device with a low height comprises a connector part, and a set of metal terminals. The connector part has a height compatible with the height of an inner space in a standard USB interface slot socket so as to be inserted into the standard USB interface slot socket. The set of metal terminals is arranged on the connector part and composed of a plurality of metal sheets and each metal sheet has an end disposed in the connector part and another end extending outward the connector part. The first end of the respective metal sheet in the set of metal terminals contacts with internal electronic signal of the standard USB interface slot socket and the second end of the respective metal sheet is soldered to a printed circuit board. Furthermore, the low height connecting device can be revised as an electronic connecting device capable of being inserted into the USB slot socket so that both of the connecting devices can be used in a dual interface memory storage apparatus or a memory storage apparatus.

7 Claims, 12 Drawing Sheets

LOW HEIGHT USB INTERFACE CONNECTING DEVICE AND A MEMORY STORAGE APPARATUS THEREOF

This application is a Division of application U.S. Ser. No. 10/058,503, entitled "LOW HEIGHT USB INTERFACE CONNECTING DEVICE AND A MEMORY STORAGE APPARATUS THEREOF" and filed on Jan. 30, 2002 now U.S. Pat. No. 6,744,634.

BACKGROUND OF THE INVENTION

1. Field of the Invention

The present invention relates to a low height USB interface connecting device and a memory storage apparatus thereof.

2. Description of Related Art

Currently, a great variety of memory cards are available for electronic products and even if same type products are made from different designs, the memory card in the respective product is different from each other. Although it is so, the various memory cards have a common feature that the digital data in the memory cards can be transmitted to the computer for data processing.

In order to be capable of reading data in the memory cards, various card readers are provided to adapt different memory cards such as a compact flash card, a SD card, a MMC card and etc. before the data can be processed with the computer. But, the arrangement makes the user inconvenient. Of course, a type of card reader is capable of supporting more specifications of memory cards but it is expensive to give a great financial burden to the user.

Therefore, as one of computer periphery, how to make the memory card, which is able to improve and reduce using the card reader and is compatible with the computer interface with the existing system hardware for being used with more facility and in accordance with our usual operation practice, is a subject worth us to deeply concern.

SUMMARY OF THE INVENTION

The USB interface is most widely applied for data transmission between a computer and a card reader among a lot of computer periphery interfaces so that an object of the present invention is to provide a memory card with a function of USB interface card reader, that is, the memory card can be inserted into a USB slot socket to execute a signal change and connection with the computer without the need of a USB interface card reader.

In order to reach the preceding object, a connector with a low thickness is disclosed first and the connector is compatible with and inserted into a USB slot socket in spite of being not in accordance with the industrial standard for a USB connector. Because various memory cards available provide a very thin thickness respectively, the standard USB interface connector provides a too much high thickness to be built up with a memory card. This is a reason that the standard USB connector is revised in the present invention.

BRIEF DESCRIPTION OF THE DRAWINGS

The present invention can be more fully understood by reference to the following description and accompanying drawings, in which.

DETAILED DESCRIPTION OF THE PREFERRED EMBODIMENTS

Figure 1:
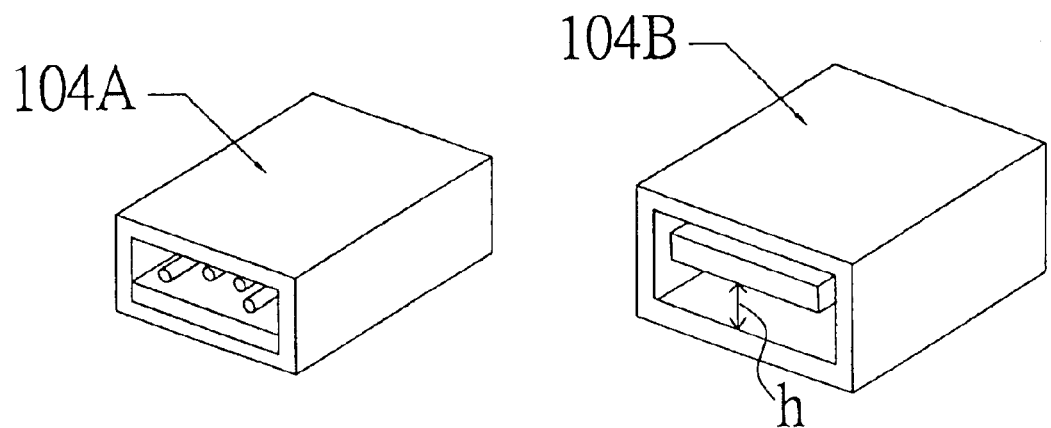
FIG. 1 is a perspective view illustrating a conventional USB connector (left side) and an inserted socket (right side)

Referring to FIG. 1, in order to explain the principle of the present invention in detail, a traditional USB interface connector is described first. It can be seen in FIG. 1 that a plug of the connector end is at the left side and a slot socket of the host end is at the right side. Wherein, the reference numbers 104A and 104B are designated as a casing of the plug and a casing of the slot socket for shielding electronic signals.

Figure 2:
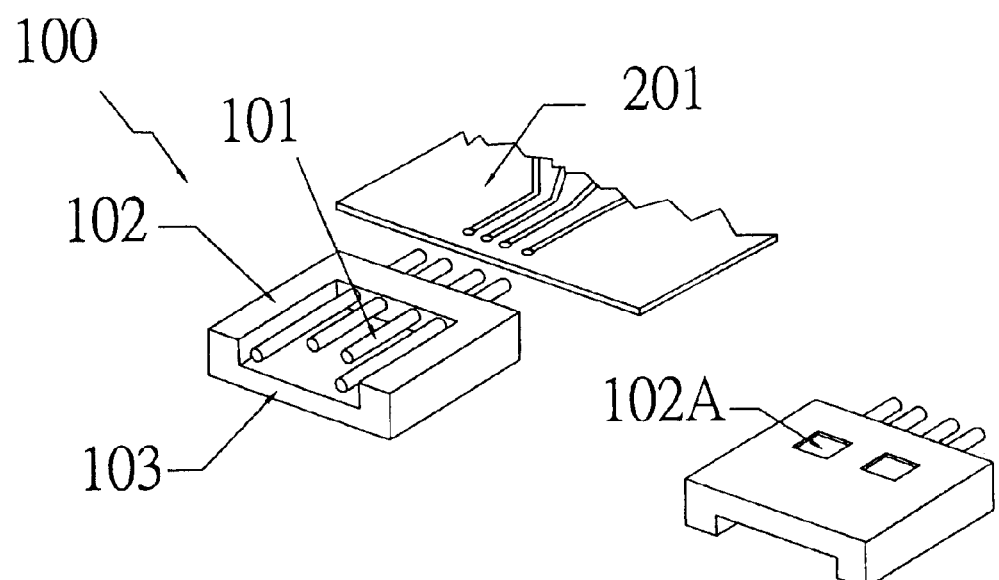
FIG. 2 is a perspective view of a low height USB connector according to the present invention.

Referring to FIG. 2, a USB low height connector 100 according to the present invention comprises a metal terminal 101, two jut pieces 102 and a connector part 103. The metal terminal 101 is composed of a plurality of metal sheets, which are the same as the metal sheets in the standard USB interface connector regardless in number, distance and size. The connector part 103 is different from the standard USB interface connector in that at both lateral sides of the connector part 103 are fixedly attached with the jut pieces 102 respectively or integrally extend the jut pieces 102 respectively. The connector part 103 is provided with a thickness same as the height of the inner space in the standard USB interface slot socket ("h" in FIG. 1) such that the connector part 103 can be inserted into the slot socket so as to transmit the signal. The respective jut piece 102 is used for preventing an incorrect signal connection resulting from the connector part 103 being inserted into the slot socket inversely so that the entire connector has a height much lower than the height of the standard USB connector. Besides, the connector part 103 can provide an external recess (102A in FIG. 2) to reinforce an engaging strength thereof during being inserted into the standard USB interface, like standard USB connector, and the connector 100 can be associated with a print circuit board 201 by way of soldering directly such that a state of close circuit can be obtained.

Comparing to FIG. 1, it can be seen in FIG. 2 that the connector 100 of the present invention does not provide the casing 104A shown in FIG. 1 so that the thickness of the connector 100 can be reduced greatly. Originally, the casing 104A is provided for shielding and decreasing an effect of signal delay generating from the USB cable, Because the connector 100 is located on the memory card, no traditional USB cable is needed, the casing, which has the function for insulating the shielding signal, can be removed from the connector part 103 of the present invention. Hence, the USB interface connector can be flattened and the USB interface product can be developed toward a trend of card shaped type. A further explanation will be described hereinafter.

Figure 3:
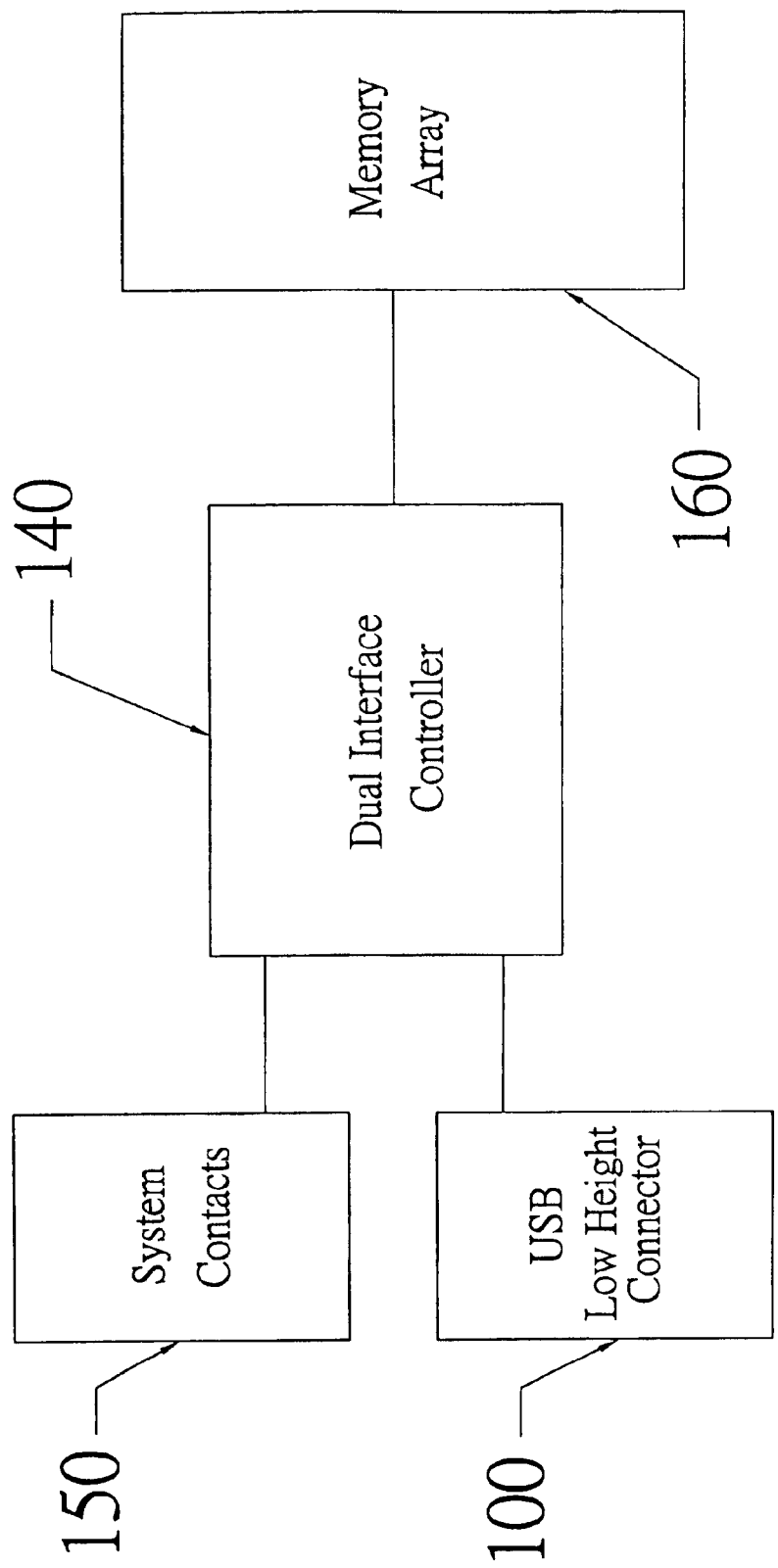
FIG. 3 is a block diagram of circuit for dual interface memory card device with low height USB connector of the present invention.

Referring to FIG. 3, a block diagram of circuit in the dual interface memory card device disclosed in the present invention is illustrated. It can be seen that the memory card has two digital data transmission interfaces, an application system interface and a USB interface. The data is saved in an internal memory 160 after the data is transmitted to the memory card from the applied system via the system connector 150. Once the memory card is taken out from the applied system, the previous designed USB low height connector 100 can be used for connecting with the USB interface of the computer main unit. That is, as soon as the memory card is inserted into the USB slot socket of the computer, the data is possible to transmit to the computer main unit without via the USB lead wire and the USB interface card reader. Wherein, a dual interface controller 140 provides a function of related applied system interfaces changing to the USB interface.

Figure 4:
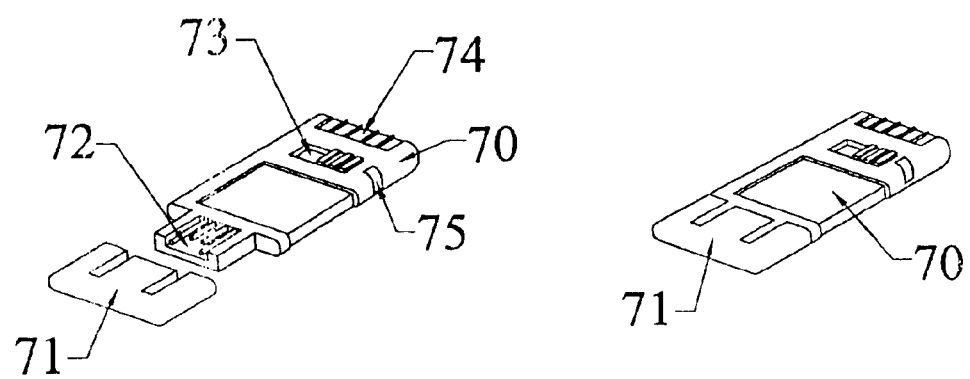
FIG. 4 is a perspective view illustrating an embodiment of the dual interface memory card with low height USB connector of the present invention.

Referring to FIG. 4, one of typical examples of the dual interface memory card according to the present invention in practice is illustrated. It can be seen that a memory card 70 attached with a cover guard 71 provides the same size as an ordinary memory card capable of being used in an applied system. In case of the memory card 70 being taken out from the system, the exposed connector 72 can be inserted into the USB interface slot socket as long as the cover guard 71 is detached. It is pretty convenient while in use.

Accordingly, the preceding low height connector can be utilized to guide the USB signal to and to write data into the memory card directly and vice versa. In this way, a memory card with two different interface connectors is completed. Meanwhile, a read only switch 73 and a signal light 75 is placed at the external part of the memory card for data security. When the switch 73 is shifted to the read only mode, the memory card only offers a function of data read so that it is not possible to write the data into the memory card. Once the switch 73 is shifted to the normal mode, the memory card can be used normally with a function of read and write and the signal light 75 is used to indicate the working status of the USB device.

Figure 5:
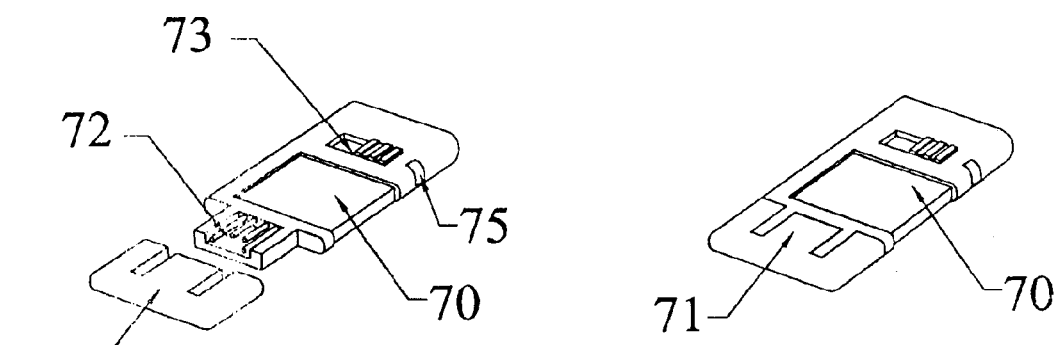
FIG. 5 is a perspective view illustrating an embodiment of the USB interface memory card with low height USB connector of the present invention.

In order to simplify the entire system further and the application system interface being deleted, the USB interface system can be remained unchanged and the low height connector can be made as a super thin USB interface memory card as shown in FIG. 5. It can be seen that the USB interface memory card shown in FIG. 5 is provided with a lighter, thinner, shorter and smaller size in contrast to a memory device with current standard USB interface connector. It means the traditional USB interface memory device can be flattened in shape by way of the technique disclosed in the present invention so that it can be an innovative product design.

Referring to FIG. 2 again, the signal may enter the memory storage apparatus after passing through the metal terminal 101 of the connector 100 by way of the terminal 101 being soldered to metal conductive pads of the printed circuit board 201. It is known that soldered joints on the circuit may result in a change of impedance of transmission line to influence the high-speed transmission for data. Hence, how to remove the soldered joints is another object of the present invention. A way to eliminate the soldered joints can be done by way of the signal touching the metal conductive pieces of the printed circuit board in the memory storage apparatus via the USB terminal of the main unit instead of using a connector. This is a design concept of so-called golden finger recognized by the makers, that is, the direct contact is used instead of the connector for circuit connection to enhance the electronic feature of the memory storage apparatus during performing high-speed transmission.

Figure 6:
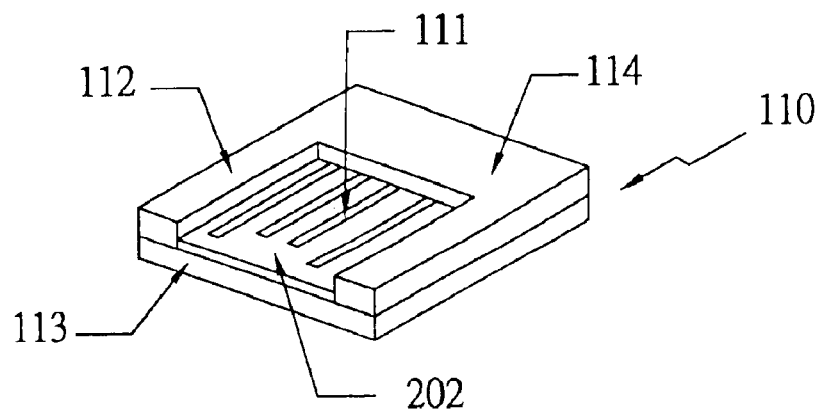
FIG. 6 illustrates a disassembled perspective view and an assembled perspective view of a planar electrode contact without USB connector according to the present invention.
Figure 6:
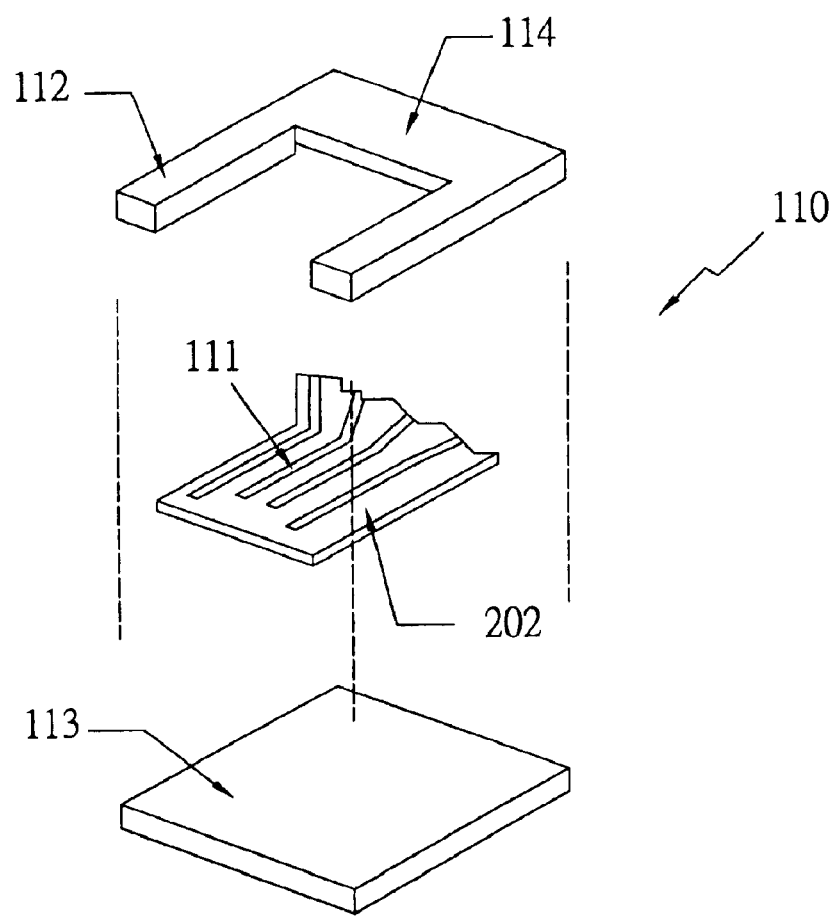

Referring to FIG. 6, a principle of design with no connector is illustrated further. A planar electrode contact without USB connector 110 with a USB contact end is shown in FIG. 6 and the entire height of the connector 110 can be received in the USB slot socket of the main unit after a printed circuit board 202 being associated with a base 113 and the fool proof jut piece 112 is integral with the casing 114 and disposed at two opposite lateral sides of the printed circuit board 202. The metal connective pieces 111 laid out on the printed circuit board 202 are utilized to replace the metal terminal 101 shown in FIG. 2. Hence, once the preceding connector is assembled, it provides a function same as the connector shown in FIG. 2 so that the planar electrode contact 110 can be used instead of the traditional USB connector and deficiency generated from the soldered joints on the circuit can be eliminated completely. In addition, the process for setting up the product during production operation can be simplified substantially. Besides, the base 113 can also provide an external recess (112A in FIG. 13) to reinforce an engaging strength thereof during being inserted into the standard USB interface, like standard USB connector.

Figure 7:
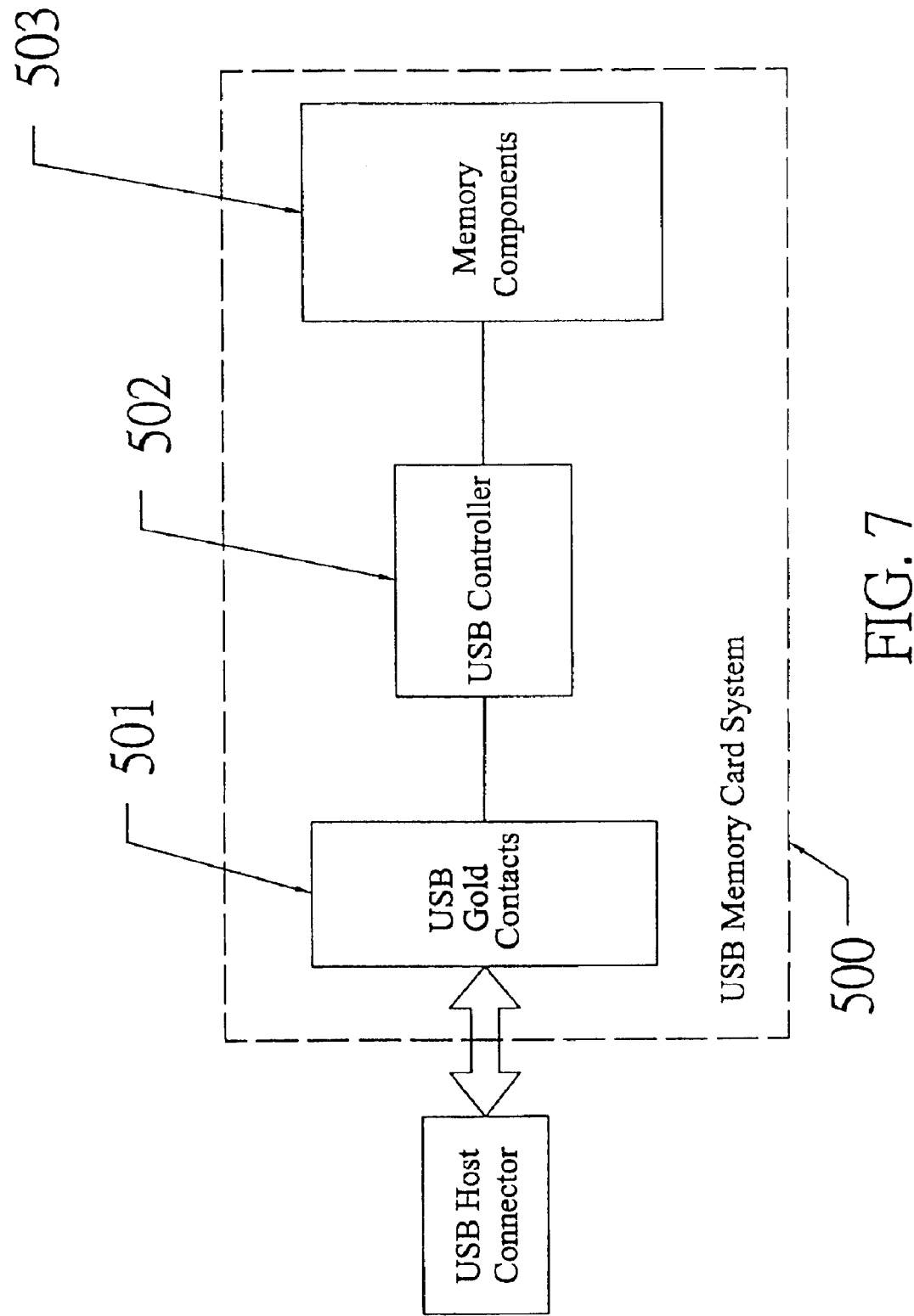
FIG. 7 is a system block diagram of a planar electrode contact without USB connector of USB interface memory card according to the present invention.

Referring to FIG. 7, a system block diagram of the USB memory card system according to the present invention is illustrated. The system 500 comprises a printed circuit board with USB gold contacts 501, a USB controller 502 and a memory components array 503. As the foregoing, the signal in the storage apparatus dose not pass through the connector and the soldered joints any more and connects with USB metal terminal of the host connector to form a close circuit.

Figure 8:
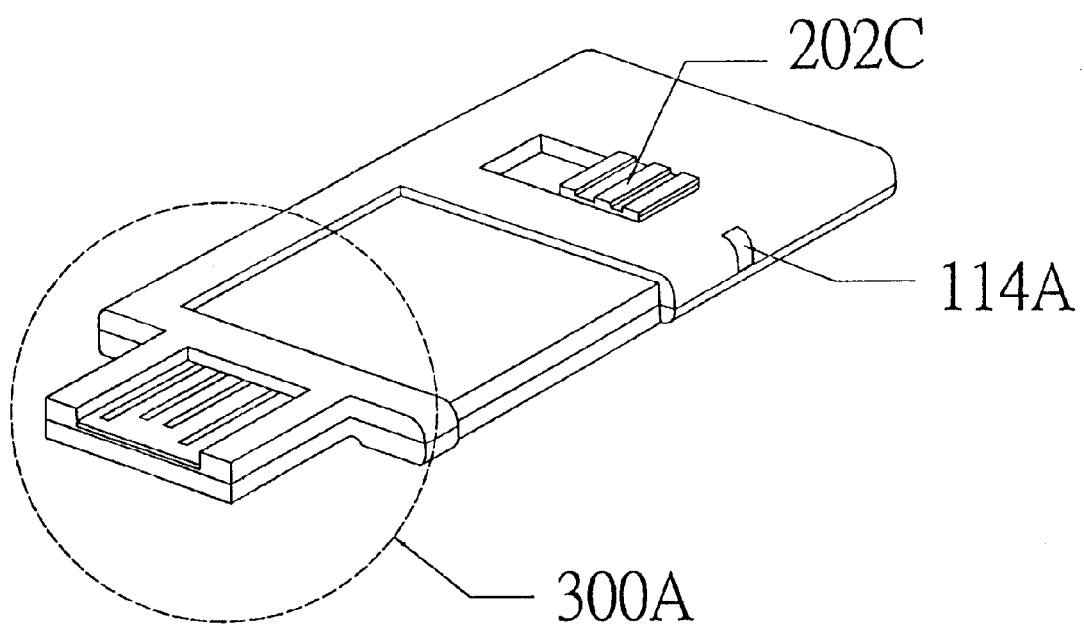
FIG. 8 is a perspective view of a planar electrode contact without USB connector of USB interface memory card according to the present invention.

Referring to FIG. 8, a USB interface data storage apparatus with a USB interface planar electrode contact, which is disclosed in the present invention, is illustrated. The thickness of the memory storage apparatus shown in FIG. 8 has greatly reduced and it effectively enhances the portability with more facility. The planar electrode contact without USB connector 300A is formed by way of the same principle of design as shown in FIG. 6. A signal light 114A is arranged on the memory card for indicating the working status of the storage apparatus. A read only switch 202C is provided to prevent the data from being covered or deleted accidentally so that the security for data can be enhanced effectively.

From the preceding method, a new USB storage apparatus is disclosed further and the new USB memory storage apparatus not only provides a much lower height than that used in the conventional USB connector but also does not need the connector to reduce extra soldered joints.

Figure 9:
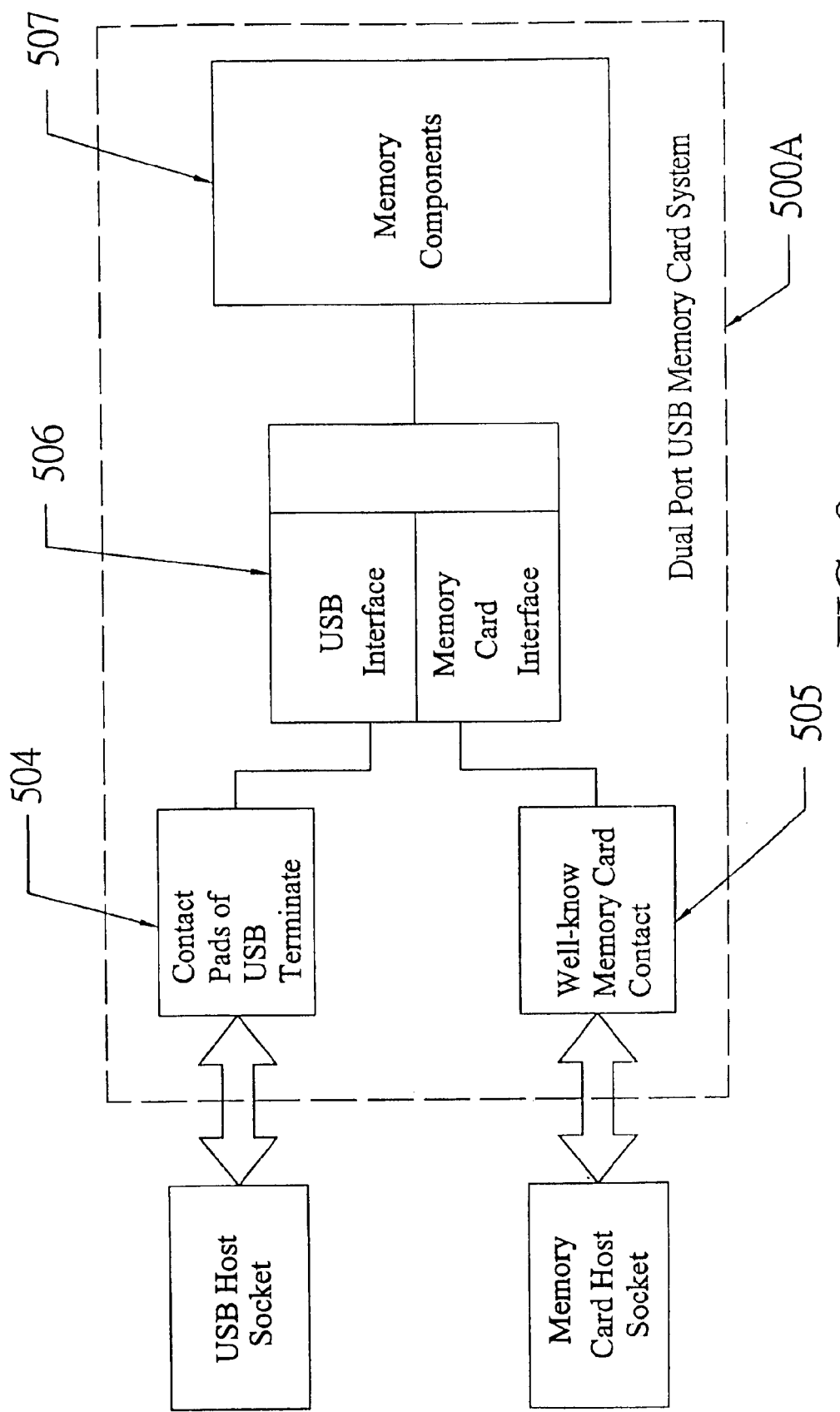
FIG. 9 is a system block diagram of a dual interface memory card with a planar electrode contact without USB connector according to the present invention.

Furthermore, the USB interface planar electrode contact disclosed in the present invention can be mounted to various currently used memory storage apparatus to lower down the height of the standard USB connector part such that it is capable of being developed a novel storage apparatus with two different interface connectors. The novel storage apparatus with two different connectors will be described further hereinafter. Referring to FIG. 9, a system block diagram for a memory storage apparatus with the preceding USB interface connector such as a memory stick card, a SD card, etc. and with an application system. Wherein, the system 500A comprises a preceding USB planar electrode contact 504, a connector 505 for a conventional application system, a controller 506 with dual interface signal switch for changing data to USB signal and application interface signal and a group of memory array 507.

Figure 10:
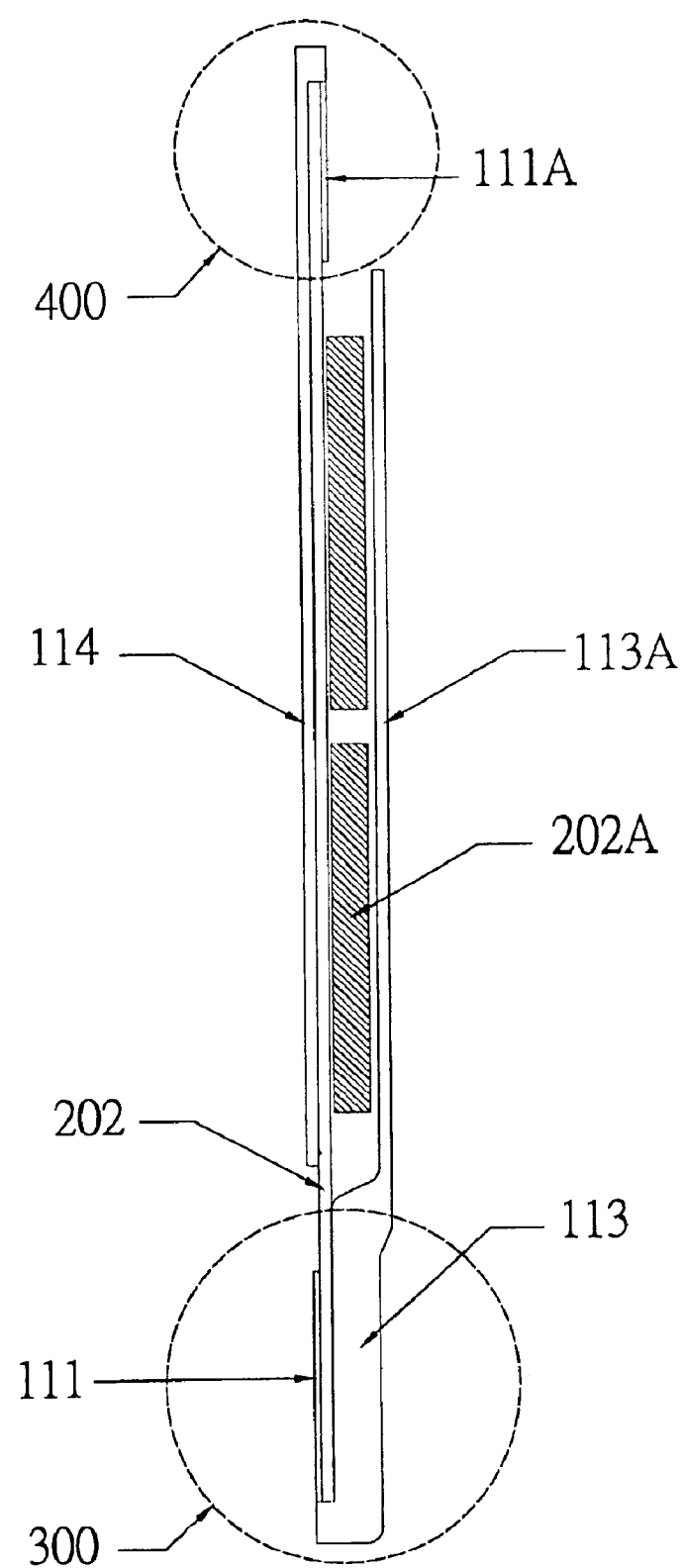
FIG. 10 is a lateral sectional view of the dual interface memory card with a planar electrode contact without USB connector of the present invention.

In order to explain a real design of the block diagram illustrated in FIG. 9, the memory stick card is taken as an example for the system design and the design method disclosed hereinafter also can be applied to other memory storage apparatus as long as a framework can be arranged properly. Referring to FIG. 10, it can be seen from the sectional view of the memory stick card that there is a USB signal contact end 300 provided for reading and writing USB signal and there is an interface end 400 of the memory stick card (application system) provided with different specifications depending on different memory cards. That is, the memory storage apparatus is capable of having two different interface ends, a USB interface end and an application interface end, wherein, the USB interface end acts as an interface for being connected to the host end signal and the application interface end such as MMC, SD, . . . , and etc. for connecting signal between the device and the application system.

When the memory storage apparatus shown in FIG. 10 has performed the job thereof in the application system of the memory stick card and is taken out from the system, a USB interface connector 300 at another end thereof can send data to the computer via the USB interface. The USB interface connector 300 can be inserted into host USB slot socket so that it is not necessary to carry out the data transmission via a card reader. A printed circuit board 202 on the surface thereof bears circuit components 202A and the casings 114 and 113A enclose the printed circuit board 202. Gold contacts 111, 111A are arranged on the printed circuit board 202 and form as a USB contact conductor and a contact conductor of the memory stick card.

It is summarized from the preceding description that the present invention discloses how to reduce the height of the USB connector in FIG. 2 for being capable of applying to the existing memory card and further discloses how to remove the connector for decreasing the number of soldered joints on the circuit and enhancing the performance of the circuit with a moderate reluctance under high speed signal transmission.

Figure 11:
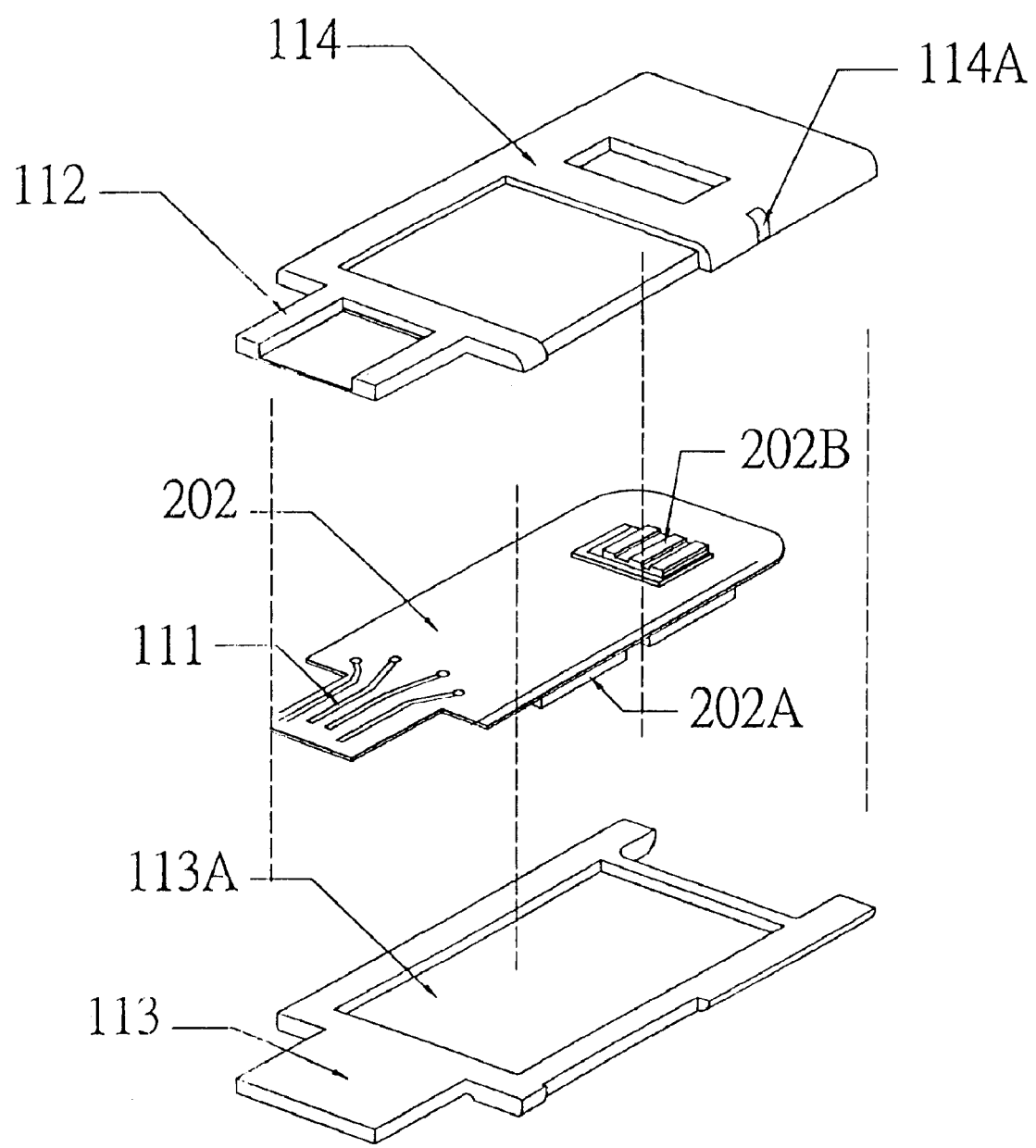
FIG. 11 is a disassembled perspective view of the dual interface memory card of the present invention.
Figure 12:
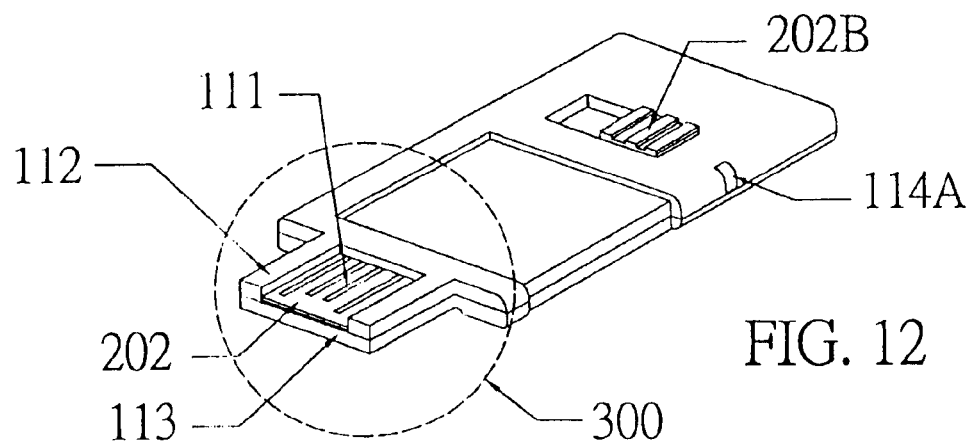
FIG. 12 is a top view of the dual interface memory card of the present invention.
Figure 13:
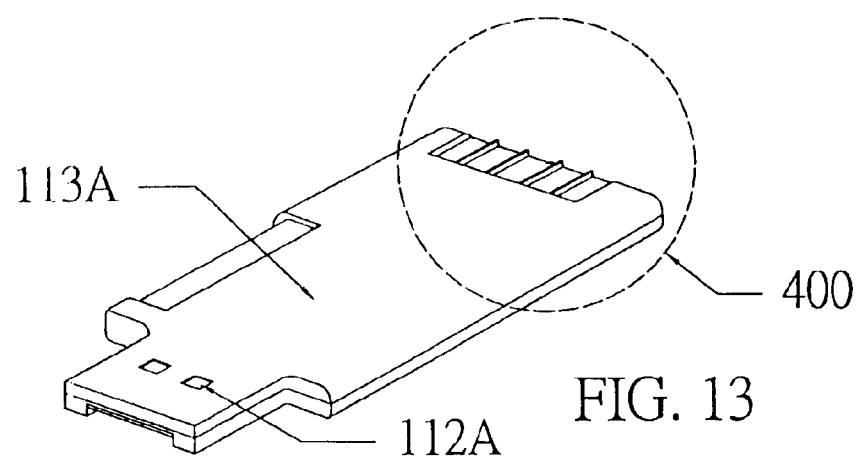
FIG. 13 is a bottom view of the dual interface memory card of the present invention.
Figure 14:
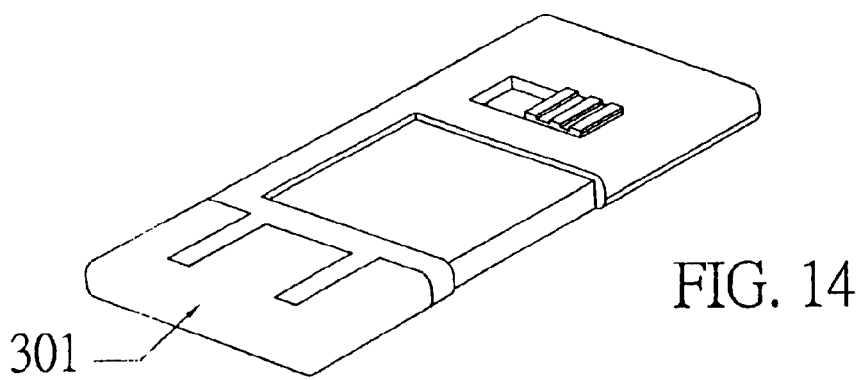
FIG. 14 is a perspective view of the dual interface memory card of the present invention illustrating a cover guard being attached to the memory card.

Referring to FIG. 11, it can be seen from the disassembled perspective view that the memory storage apparatus, for instance, the memory stick card, provides a printed circuit board 202 and two casings 114 and 113A. It is learned from the block diagram in FIG. 9 and the disassembled perspective view that the USB interface connector is not included in the memory storage apparatus of the present invention any more, and a signal light 114A can be fixedly attached to the casing 114 to indicate the work status of the memory storage apparatus as the preceding embodiment does. In addition, a read only switch 202B is arranged on the memory storage apparatus to prevent the data from being written, covered or deleted in case of the read only switch 202B being shifted to a proper mode. Referring to FIGS. 12 and 13, it can be learned from the top view and the bottom view of the memory storage apparatus that two different interface contacts 300, 400 are provided and the interface contact 300 is a USB interface contact arranged on the memory card in accordance with the design way disclosed in the present invention so that it allows the memory card to keep the feature of low height. Further, a cover guard can be added to protect parts of the USB contact. FIG. 14 shows a movable cover guard 301, which may be detachable or fixedly attached to connector.

As the foregoing, if the interface at the application system end is removed and the USB interface remains unchanged, a memory storage apparatus with USB interface only can be formed. Comparing to a memory storage apparatus with conventional USB interface, the memory storage apparatus according to the present invention is much thinner, lighter shorter and smaller in size for being carried about easily. Therefore, it is hardly said the present invention is not a novel, creative and advanced invention.

The planar electrode contact USB connecting device disclosed in the present invention provides no connector and has to satisfy portability especially in practice so that it is necessary to consider a time difference between the work status of the interface controller and the work status displayed by the system, that is, it is possible to cause a time difference between the work status displayed by the system and the work status of the real device. This is a point has to be confirmed strictly for the design of detachably portable device, otherwise, it is very likely to mislead the user due to individual different system design such that the device is detached accidentally before completing the job thereof to result in the data in device being damaged.

Figure 15:
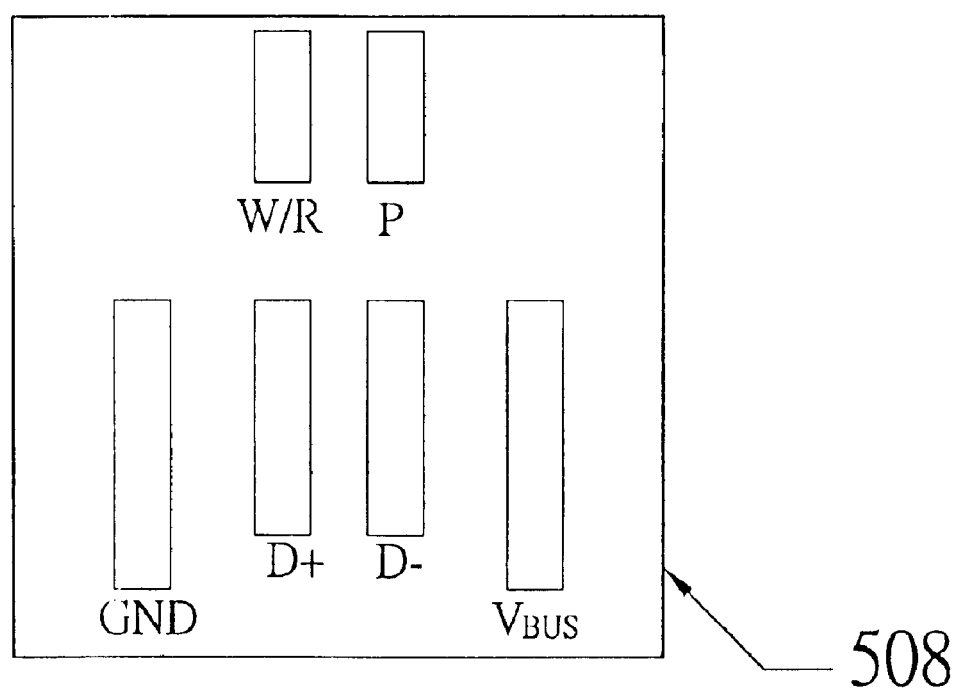
FIG. 15 is a schematic diagram illustrating a framework of interface signal according to the present invention.

However, the standard USB interface signal is not sufficient to offer a solution so that a new interface signal is designed in the present invention to solve the preceding problem thoroughly. Referring to FIG. 15, an interface signal framework 508 (corresponding to the circuit board 202 in FIG. 6) comprises a power supply ($V_{bus}$) for offering a working voltage, a signal group including a D+ and a D− signals, a ground signal (power GND) to constitute a standard USB interface signal group. The difference of the present invention from the conventional USB interface signal is that an apparatus work signal group is provided additionally. The work signal group supplies a work signal for indicating the work status of the apparatus and the D+ and D− signals are data signals in accordance with the specification of the standard USB interface. The apparatus work signal group is supplied by the apparatus end connects with the controller of the apparatus end by way of a necessary circuit.

Wherein, the power supply ($V_{bus}$) can support 5 volts, 3.3 volts, 2.5 volts and 1.8 volts so that it is possible for the power supply to offer a working voltage in different specifications. The apparatus working signal group includes a work signal W/R and a power providing signal P. In case of the device being designed as a memory storage apparatus such as the USB memory card, the work signal W/R indicates if there is any data being transmitted on the interface (read/write). In case of the device being input/out apparatus such as a USB network card, the work signal W/R indicates if there is any data being transmitted on the interface (upload/download).

Figure 16:
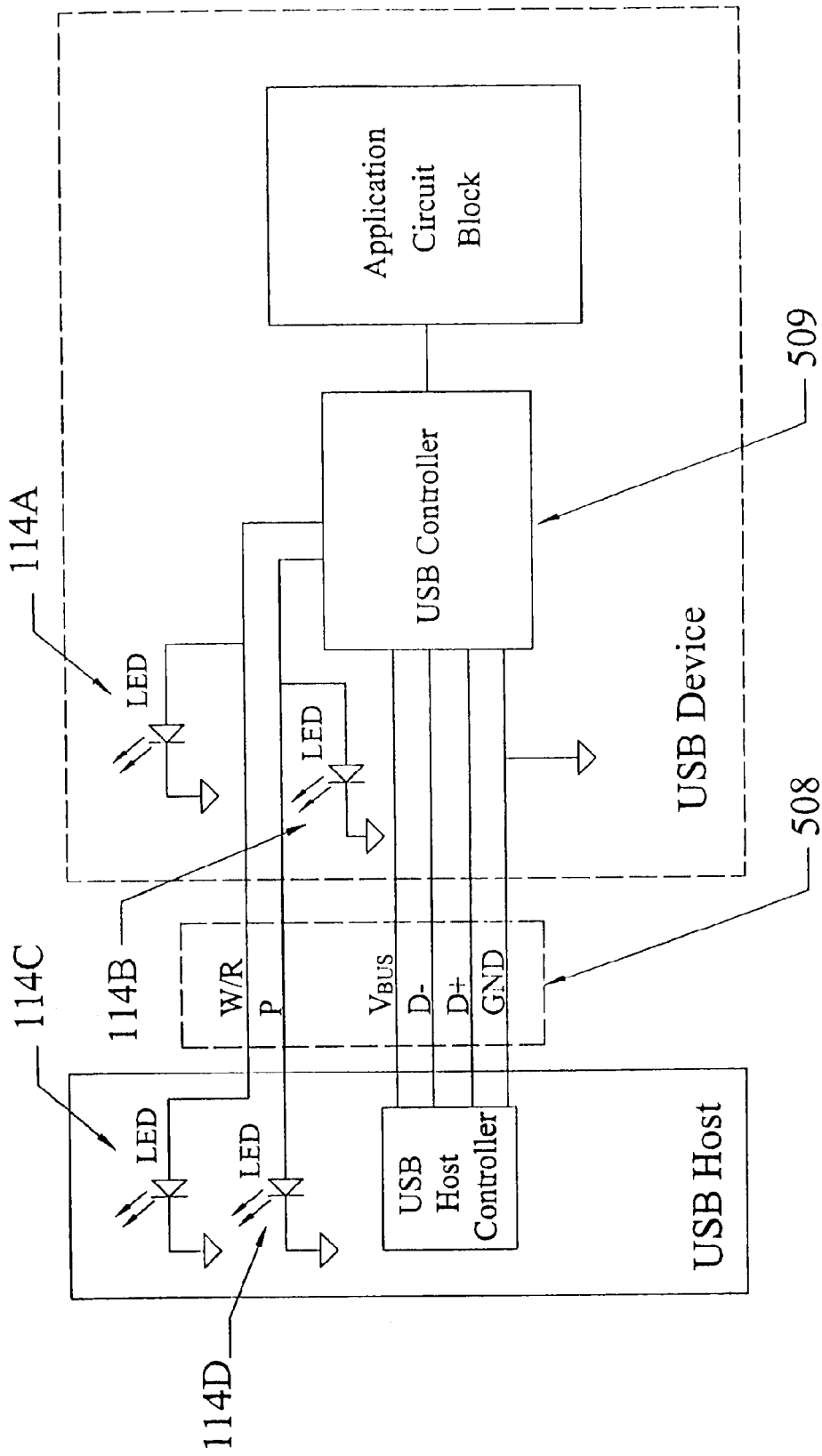
FIG. 16 is a circuit diagram based on the framework of interface signal.

Referring to FIG. 16, a circuit diagram with an interface signal framework is illustrated. The W/R work signal is supplied by an interface controller 509 and as soon as the data is transmitted on the USB interface, a signal light such as LED arranged at the external part of the device can be triggered via the W/R signal. Hence, the user can confirm the actual work status of the interface controller through an external signal light 114C to prevent the device from being removed from the system accidentally.

When the device is used for the standard USB interface slot socket, the standard USB interface does not support W/R signal so that the device itself has to have a data signal light. Meanwhile, the W/R signal can trigger a signal light 114A arranged in the device. By the same token, the power providing signal P provides the same principle of being actuated. Referring to FIG. 16 again, as soon as the USB interface is inserted, the interface controller 509 can offer a power providing signal P to trigger a signal light 114D arranged on the host. The signal light 114D is used for indicating if the device is in a state of electricity consuming work or in a state of electricity consuming alert. Similarly, the providing signal P can also trigger the power signal light 114B arranged in the device.

While the invention has been described with reference to a preferred embodiment thereof, it is to be understood that modifications or variations may be easily made without departing from the spirit of this invention, which is defined in the appended claims.

What is claimed is:

1. A dual interface memory storage apparatus without USB interface connector, which is connected with a receptacle contact of one of a USB socket and an interface socket having a set of USB signals, comprising:

a casing having an opening;

a printed circuit board located in the casing and having a circuit layout with a plurality of lead wires extending outwardly from the casing;

a memory array having a memory component for saving data;

a dual interface controller selectively changing data in the memory component into a signal in accordance with a predetermined USB interface specification and changing a USB signal into saved data stored in the memory component, and connected to the memory array to form a circuit; and a set of non-USB connector connecting devices located on the casing and being connected to the printed circuit board.

2. The storage apparatus according to claim 1, wherein one of the non-USB connector connecting devices is formed with a metal lead wire part.

3. The storage apparatus according to claim 1, wherein the printed circuit board has a connector having a metal lead wire part.

4. The storage apparatus according to claim 1, further comprising a connector fixed to the printed circuit board.

5. The storage apparatus according to claim 1, wherein the printed circuit board has a read only switch accessible from an exterior of the casing to prevent data being written into the memory component.

6. The storage apparatus according to claim 1, wherein a signal light is mounted externally for indicating a work status of read or write.

7. The storage apparatus according to claim 1, wherein a detachable cover guard is provided to fit with on the casing.

* * * * *